March 11, 1924.                L. F. WESCHE                1,486,209
                AIR PRESSURE ALARM DEVICE FOR PNEUMATIC TIRES
                          Filed Aug. 24, 1921
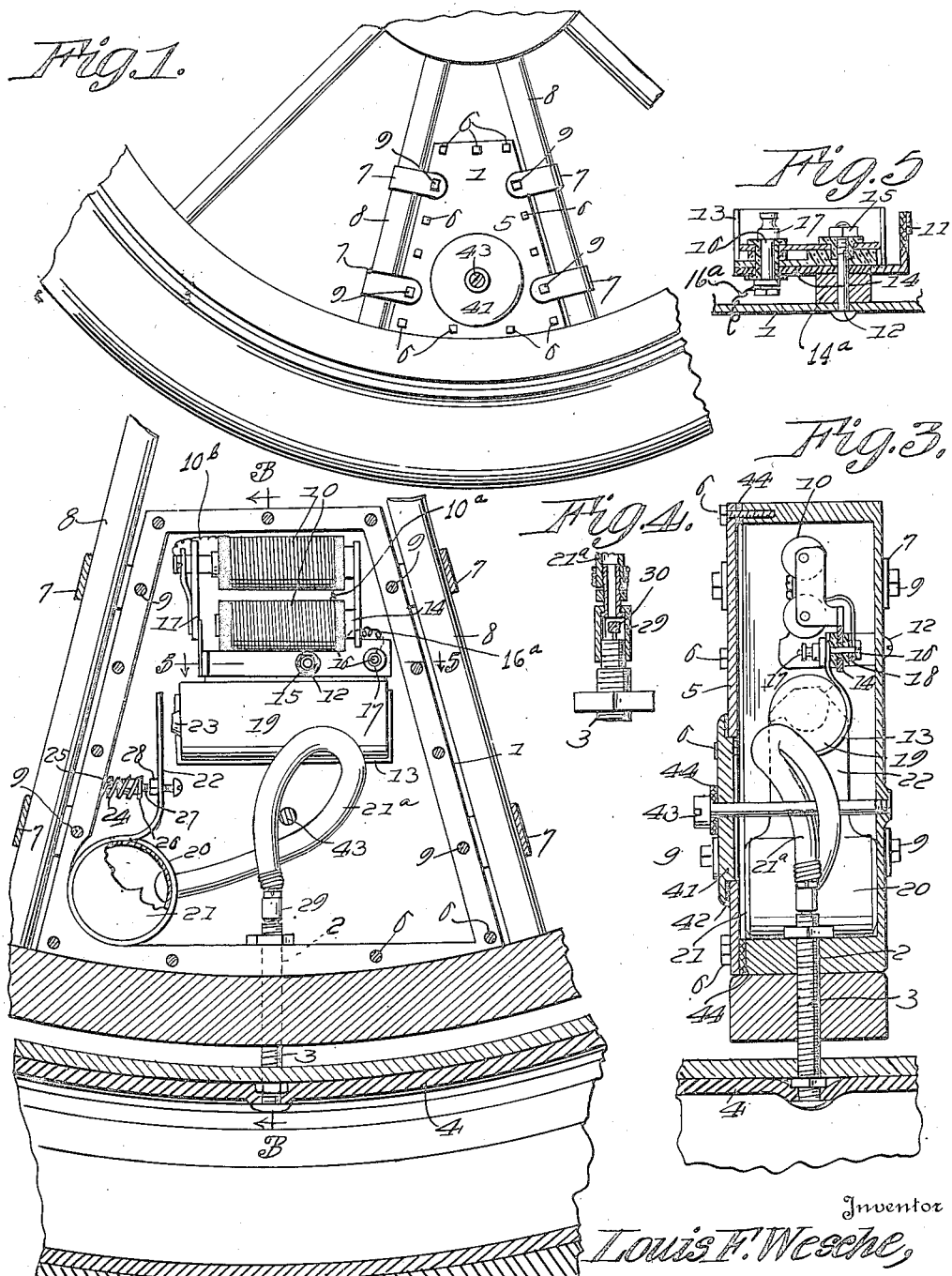
Inventor
Louis F. Wesche,
By Watson E. Coleman
        Attorney Patented Mar. 11, 1924.

1,486,209

UNITED STATES PATENT OFFICE.

LOUIS F. WESCHE, OF WEBB, IOWA.

AIR-PRESSURE ALARM DEVICE FOR PNEUMATIC TIRES.

Application filed August 24, 1921. Serial No. 495,056.

*To all whom it may concern:*

Be it known that I, LOUIS F. WESCHE, a citizen of the United States, residing at Webb, in the county of Clay and State of Iowa, have invented certain new and useful Improvements in Air-Pressure Alarm Devices for Pneumatic Tires, of which the following is a specification, reference being had to the accompanying drawings.

It is the purpose of the present invention to provide a device of this kind particularly including a circuit closer for actuating a buzzer or similar alarm, when the pressure in a pneumatic tire decreases, thereby giving a warning that the inner tube needs a requisite supply of air, or otherwise requires attention.

Another purpose is to provide a device of this kind, wherein the circuit closing parts or elements of the circuit closer are held out of contact by the requisite pressure in the tire, and allowed to contact by the action of a spring, when the pressure in the tire decreases, so as to give warning that the tire needs attention.

A still further purpose is the provision of an alarm device to be carried on the wheel adjacent the felly thereof between two adjacent spokes, there being means engaging two adjacent spokes for holding the casing of the device in place.

A further purpose is the provision of means for permitting access to the interior of the casing, for the purpose of attaching and detaching the inflating tube of a pump to the inflating valve tube, and when the inflating tube of the pump is disconnected, a suitable tube from a pneumatic bag may be connected to the inflating valve tube, so that the pressure in the tire may hold the contact end of the cooperating contacting elements of the circuit closer out of engagement.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in side elevation of a portion of a wheel, showing the improved alarm device as applied;

Figure 2 is a sectional view of the device shown in Figure 1, illustrating the circuit closer and alarm device and the pneumatic bag connected to the inner tube of the tire;

Figure 3 is a sectional view on line 3—3 of Figure 2;

Figure 4 is an enlarged detail view of the connection between the tube 21ª and the inflating valve tube; Figure 5 is a sectional view on line 5—5 of Figure 2.

Referring to the drawings, 1 designates the casing, which may be any suitable shape, preferably of a contour to fit between two adjacent spokes of a wheel, and to conform to the inner surface of the felly of a wheel. One end of the casing has an opening 2 for the reception of the inflating valve tube 3 of the inner tube 4 of the tire. The casing 1 is provided with a cover plate 5, which is relatively thick, and is secured to the casing by means of cap bolts 6. The sides of the casing are relatively thick, in order to be tapped to receive the cap bolts. Metal straps 7 straddle two adjacent spokes 8 of the wheel, and are relatively thick, so as to be secured to the casing by means of the bolts 9. The ends of these bolts 9 are threaded into the ends of the metallic straps 7, in order to secure them in position, and hold the casing rigid to the wheel.

A suitable buzzer comprising the electromagnets 10 and the armature 11, which vibrates, is mounted in the casing on the screw 12. A holding casing 13 is secured to the frame 14 of the buzzer by means of the screw 12 and nut 15, and an additional screw 16 and nut 17. However the holding casing 13 is in circuit with the electromagnets of the buzzer, while the screw 12 is in circuit with the side of the casing 1. The holding casing is designed to contain a suitable dry battery 19, such as those as are carried by or used in flashlights. The holding casing 13 surrounds the battery sufficiently to hold it in position, there being flanges on the ends of the holding casing 13, to prevent endwise movement of the battery. A band 20 is mounted in one corner of the casing 1, and is in circuit therewith, and carries a pneumatic bag 21. It will be noted that this band comprises a piece of spring sheet metal turned into cylindrical form, and is capable of expanding and contracting due to the expansion and contraction of the pneumatic bag, when inflated or deflated. The cylindrical portion which receives the pneumatic bag has its ends terminating close to the walls of the casing so that the walls of the casing can serve to limit end expansion of the bag and cause the major portion of the force to be exerted radially of the bag when the bag is inflated. The bag will be formed of material sufficiently heavy to prevent pinching during expansion and contracting of the bag. The band which contains the pneumatic bag has a spring tongue 22, which has its end portion arranged in close position to the contact end 23 of the battery, so that when the tongue is moved toward said contact end 23 of the battery, a circuit will be closed through the pneumatic bag holding band, the casing 1, the holding casing 13, then through the electromagnets, and thereby cause the armature to vibrate, creating a buzzing noise, hence giving warning that the inner tube of the tire needs attention, to the extent of a necessary supply of air, or other attention.

A spring 24 is mounted on a stud 25, and engaged with one end of the coil spring is a flanged socket member 26. The spring engages the flange of the socket member, while a screw 27 (which passes through the tongue 22 of the pneumatic bag holding cage) is engaged in the socket member, there being a nut 28 on the screw, to be adjusted, for regulating the tension of the coil spring, and thereby regulate the position of the tongue 22 relatively to the contact end of the battery. A suitable tube 21ª is connected to the pneumatic bag, and is provided with a swivelled nipple 29, to be engaged with the threaded end of the inflating valve tube of the tire, so that after the inner tube of the tire is inflated, the air under pressure will enter the pneumatic bag and expand the same, sufficiently to distend the free moving parts of the band sufficiently to hold the tongue 22 away from the contact end of the battery, against the action of the coil spring. The end of the tube which carries the swivelled nipple has an abutment member 30, to engage the end of the inflating valve of the inflating valve tube, to hold it normally unseated, when the tube is connected.

When the device is applied to a wheel, the usual pump tube, (not shown) is attached to the inflating valve tube, for inflating the inner tube of the tire. After inflating the inner tube, the pump tube is detached, then the tube which is connected to the pneumatic bag is connected to the inflating valve tube, so that the air under pressure in the inner tube may enter the pneumatic bag. In fact the inner tube of the tire is inflated to the desired pressure, and when this pressure decreases, from any cause whatever, possibly due to a slight puncture, or otherwise, the pneumatic bag will contract, and the coil spring will then exert pressure sufficiently on the tongue of the pneumatic bag holding band, so as to force the tongue toward the contact end of the battery. When the tongue engages the contact end of the battery, the circuit is closed, and the buzzer then actuates, giving warning that the tire needs attention.

The cover plate of the casing 1 is provided with a circular opening, over which a second circular cover plate is arranged. This second cover plate 41 has a portion protruding through the circular opening of the cover plate 5, there being a rubber gasket 42 between the second cover plate and the cover plate 5, to insure maintaining the casing 1 watertight. A suitable screw bolt 43 passes through the cover plate 41, and is threaded into the side of the casing 1, so as to hold the second cover plate 41 in position. A suitable packing of rubber 44 is interposed between the cover plate 5 and the marginal edge of the casing 1, to render the casing 1 watertight.

The tracing out of the circuit, when the pressure of air in the inner tube decreases, is as follows: The spring 24 acts against the tongue 22, owing to the pneumatic bag 21 becoming partly deflated, so that the tongue will contact with the contact end 23 of the battery, thereby closing the circuit from the battery, through the holding casing 13, through the binding screw 16, and then through the wire 16ª to one of the electromagnets, then through the connection 10³ to the other electromagnet, thereby energizing both magnets, and attracting the armature. Vibrating continuously through the wire or lead 10ᵇ, through the frame 14 of the buzzer, along the under part of the frame 14 to the casing 1, by way of the screw or bolt 12, and owing to the frame 20 being engaged with the frame 1, the current passes from the casing 1 through the tongue, back to the battery. The energizing of the magnets by the closing of the circuits, which alternately makes a break, and the armature is vibrated, thereby creating a buzzing noise, giving warning that the tire needs attention.

The invention having been set forth, what is claimed as being new and useful is:

1. An air pressure failure indicating device comprising a support, a normally inflated flexible member mounted upon the support, a contractile band surrounding said inflated member and having an extension, a source of current having one terminal connected with an alarm device and its other terminal disposed in the path of said extension, the other terminal of the alarm device being grounded onto said support, deflation of said inflated member permitting said extension to engage said second named terminal of the source of current to close the circuit through the alarm device.

2. In a signal system including an alarm device and an energizing circuit for the alarm device including a source of current having opposite terminals, one terminal being connected with the alarm device, a circuit closer in the circuit comprising a normally inflated pneumatic bag, and a contractile band surrounding the bag and formed with an extension adapted to engage the other terminal of the source of current for closing the circuit through the alarm when the bag is deflated.

3. In a signal system including an alarm device and a source of current having one terminal connected therewith, a circuit closer comprising a normally inflated pneumatic bag, a contractile band surrounding the bag and formed with an extension adapted to engage the other terminal of the source of current for closing the circuit through the alarm, and means for adjusting the initial position of the extension with respect to the second named terminal.

4. A pressure operated circuit closer including a normally inflated pneumatic bag, a contractile band surrounding the bag and formed with an extension, a source of current having one terminal connected with an alarm which has its other terminal grounded onto said band, the other terminal of the source of current being disposed in the path of movement of said extension whereby to be engaged thereby upon deflation of the pneumatic bag.

5. A pressure operated circuit closer including a normally inflated pneumatic bag, a contractile band surrounding the bag and formed with an extension, a source of current having one terminal connected with an alarm which has its other terminal grounded onto said band, the other terminal of the source of current being disposed in the path of movement of said extension whereby to be engaged thereby upon deflation of the pneumatic bag, and screw means for adjusting the initial position of the extension with respect to the second named terminal of the source of current.

6. In a signal device including a source of current, and an alarm connected with one terminal of the source of current, a support having a ground connection with the other terminal of the alarm device, a normally inflated pneumatic bag carried by the support, a contractile band surrounding the bag and having an extension adapted to engage the other terminal of the source of current, a spring urging the extension toward said second named terminal of the source of current and a screw for regulating the tension of said spring and thereby adjusting the position of the extension.

In testimony whereof I hereunto affix my signature.

LOUIS F. WESCHE.